Nov. 6, 1951 W. R. MacLEAN 2,573,799
APPARATUS FOR MAGNETICALLY MEASURING THICKNESS OF FERROUS PIPES
Filed April 23, 1946 5 Sheets-Sheet 1

INVENTOR.
WILLIAM R. MACLEAN
BY
ATTORNEYS

Nov. 6, 1951     W. R. MacLEAN     2,573,799
APPARATUS FOR MAGNETICALLY MEASURING THICKNESS OF FERROUS PIPES
Filed April 23, 1946     5 Sheets-Sheet 3

INVENTOR.
WILLIAM R. MACLEAN
BY
ATTORNEYS

Patented Nov. 6, 1951

2,573,799

UNITED STATES PATENT OFFICE 2,573,799

APPARATUS FOR MAGNETICALLY MEASURING THICKNESS OF FERROUS PIPE

William R. MacLean, Brooklyn, N. Y.

Application April 23, 1946, Serial No. 664,183

7 Claims. (Cl. 175—183)

This invention pertains to means for measuring the thickness of the walls of a pipe accessible from the inside but not necessarily from the outside. It is particularly adaptable for measurements on pipes of ferrous materials, i. e., iron or steel. It is an electromagnetic method utilizing the phenomenon of the attenuation of an alternating electromagnetic field propagating through a metal.

The necessity for making such measurements arises in the case of pipes buried in the ground, such as oil well linings, gas and water pipes, or in the case of boiler tubes and other similar constructions where the inside is easily accessible while access to the outside is either inconvenient or impossible. In all such cases, a method of gauging the wall thickness which operates entirely from inside the pipe is useful and desirable, whereas any method requiring access to both sides would be unusable.

Electromagnetic methods which accomplish this result to a more or less extent are known. For instance, there is a testing device which has been used for the production testing of thin metal cylinders, such as shell casings. In this device, a primary coil excited with alternating current and an adjacent secondary coil are mounted in such a way that a shell casing can be slipped over the outside. Induced voltage in the secondary is measured in amplitude or phase, or both, and this measurement is used as an indication of the characteristics of the metal of the shell casing. The resulting measurements will vary with the conductivity, permeability and thickness of the shell casing. This device is used in mass production testing for quality control.

If the properties of the metals can be assumed nearly constant, these readings would in principle give indications of the thickness of the metal walls. As ordinarily carried out, it is found that thickness indications are usable only for very thin walls in the case of iron and steel. If a variety of samples of steel tubing are measured by this method, the samples increasing successively in wall thickness, the amplitude or phase or both of the voltage induced in the secondary coil approaches asymptotically a limiting value as the wall thickness increases. The wall thickness at which this asymptotic value is essentially attained is that thickness which is approximately equal to the so-called depth of penetration of the field into the metal.

This depth of penetration decreases with increasing conductivity and increasing permeability for a given frequency. This depth of penetration is very much smaller in iron and steel than in non-ferrous metals and hence the maximum thickness at which this arrangement is operative as a thickness gauge is much smaller with iron than with, for instance, brass.

This phenomenon of limited penetration is so marked in the case of iron that such an arrangement can be used for indicating the depth of case hardening into thick walls. The indication of depth of case hardening is then relatively independent of the actual thickness of metal.

This same method could conceivably be extended to the measurement of the wall thickness of a pipe or long tube accessible only from the inside, and such a machine is actually in existence. This limitation due to the small depth of penetration into iron is so serious, however, that the machine is not practical for use in iron or steel pipes, although it is operative when used in pipes or tubes made of non-ferrous materials.

The depth of penetration of an alternating electromagnetic field into metal, which is the limiting factor in the existing machines known, can in principle be increased without limit by decreasing the frequency. In the case of steel or iron, the frequency of alternating current required to make the depth of penetration sufficiently great is so low, however, that great practical difficulties are created in its generation or in its measurement.

In the measuring device just described, there is also no simple theoretical relationship between the wall thickness and the readings of induced voltage which could be used for the calibration of the device in terms of thickness, even in those cases where the walls are sufficiently thin to make it operative; it is necessary to make an empirical calibration or none at all, using the instrument for qualitative observations only.

It is the purpose of this invention to solve this problem of measuring the wall thickness of pipes made of ferrous metals, and to provide an improved method for non-ferrous pipes. The present invention accomplishes this purpose by making use of the small depth of penetration rather than by avoiding it. The physical modification in the prior art described above necessary to accomplish this purpose is extremely simple. It is merely necessary to decrease by a very large factor the amount of coupling between the primary and secondary coils by separating the two coils physically by a considerable distance.

As will be shown later, this separation results in a complete change in the principle of operation. The voltage and phase of the electromotive force induced in the secondary coil in the present invention vary radically with changes in wall thickness precisely because the depth of penetration is small compared with the wall thickness.

In addition, the magnitude and phase of the induced voltage in the secondary coil bear simple theoretical relationships to the wall thickness: the magnitude varies as a negative exponential function of the thickness, and phase varies linearly as the thickness. Hence, either of the two polar coordinates of the induced voltage, magnitude or phase, may be used as a measure of wall thickness. The reason for this will be clarified by the detailed discussion to follow and by an examination of the attached figures in which.

Figure 1:
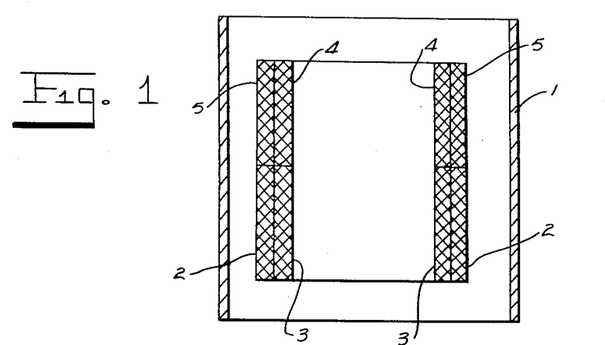
Figure 1 is a schematic drawing of a coil arrangement used in the prior art.

In Figure 1 is shown a short section of metal tubing 1 which might be a piece of shell casing or a section of a long pipe accessible from the inside only, within which are located four coils 2, 3, 4 and 5. The four coils of Figure 1 can be combined into a primary and secondary group in at least two simple ways. For instance, the inside coils 3 and 4 could be the primary and the outside coils 2 and 5 could be the secondary; or alternatively, the lower coils 2 and 3 would be the primary and the upper coils 4 and 5 the secondary. Both of these arrangements result in rather close coupling between the primary and secondary.

If in such an arrangement the primary were supplied with alternating current, there would be induced in the secondary an electromotive force. This electromotive force would have a certain amplitude and bear a certain phase relationship with the primary current.

It is clear that the nature of the induced electromotive force, i. e., its phase and amplitude, will change when the coil assembly 2, 3, 4 and 5 is placed inside the metal tube 1. The metal tube 1 if made of ferrous material appears in a certain sense to act like a partial magnetic core tending to increase the magnitude of the electromotive force induced in the secondary. Due to the conductivity of the tube 1, however, it also appears to act as a short-circuited secondary and in that way to reduce the electromotive force induced in the secondary coil. With one of these effects predominates will depend on the quantitative relationships involved. These effects are called to mind in this manner by consideration of electric and magnetic circuit theory.

There is however another point of view based on field theory which sheds more light on the true nature of the phenomena. In Figure 1 the pipe 1 can influence the electromagnetic field on the inside and hence the nature of the induced electromotive force in the secondary coil only insofar as its fixes the relationship between the electric field strength and magnetic field strength on its inner surface. This relationship or boundary condition in the first instance depends upon the frequency, conductivity and permeability, in that these would determine this relationship for an electromagnetic wave propagated through the metal in an outward direction.

In the vicinity of the primary coil, the phenomena observed on the inside of a pipe of finite thickness could differ from those observed in a pipe of similar material but of infinite wall thickness only insofar as the electromagnetic wave propagating outward is reflected at the outer wall and returned to the inner wall.

Since a wave propagated in a metal is attenuated with extreme rapidity, this reflected wave will have a negligible intensity when it returns to the inner surface, unless the wall thickness is not large compared with the so-called depth of penetration.

The propagation of an electromagnetic wave in metal for an arbitrary or a complicated field configuration is rather difficult to calculate. The principle can, however, be illustrated by using as an example a simple field pattern. Let us consider an infinite sea of metal over the surface of which is maintained a magnetic field of strength $B_0$ parallel to the surface and pointing in one direction only. Inside the metal the magnetic field will point in the same direction but will differ in phase and magnitude. In particular, the magnitude will be given by:

(1) $$B = B_0 \epsilon^{-\frac{x}{\delta}}$$

where $B_0$ = the magnetic field strength at the surface of the metal
$B$ = the magnitude of the magnetic flux at depth $x$
$\delta$ = the quantity called "depth of penetration"
$\epsilon = 2.718$ From Equation 1 it is seen that the magnetic field is reduced by the factor 2.718 for every increment of depth equal to the depth of penetration.

The magnetic field $B$ established in the infinite sea of metal in the present example will of necessity be accompanied by an electric field of strength $E$. This electric field will be at right angles to the magnetic field and the ratio $B/E$ does not vary with $x$ and is a characteristic of the metal. All phenomena above the surface of the metal are determined by this ratio at the surface. All phenomena above the surface will remain unchanged as long as the ratio $B_0/E_0$ is constant.

Now imagine the sea of metal replaced by a plate of finite thickness. The wave propagating downward will be the same as in the infinite case, but there will also be a wave propagating upward due to reflection at the lower surface. In this reflected wave, the ratio $B/E$ is the same as before, except that their relative phase is reversed. At the upper surface $B_0$ and $E_0$ are composed each of a downward and an upward travelling part. Due to the reversal of relative phase of $B$ and $E$ in the upward travelling wave, the ratio $B_0/E_0$ at the upper surface will differ from the case of the infinite sea. This difference will react on the field above the upper surface and change it. However, the extent of this change will depend on the relative strength of the upward and downward waves at the upper surface. Since the upward wave has suffered an attenuation by a round trip passage through the thickness of the plate, it may be relatively weak. If the plate were, for instance, 4δ thick, the upward wave would be attenuated by a factor $(2.718)^8$, i. e., by a very great deal. Hence for a plate thickness of 4δ, the reflected wave could influence the phenomena above the plate only a negligible amount, i. e., a plate of thickness 4δ already appears infinitely thick.

Although this calculation is made for an infinite plain metal surface, it is qualitatively correct in the neighborhood of the primary coil for the case of a cylindrical surface as shown in Figure 1. This analysis shows that the phenomena within the pipe near the primary are no longer affected by the wall thickness when this thickness is appreciably more than the depth of penetration.

The depth of penetration is given by the formula:

(2)
$$\delta = \sqrt{\frac{2}{\omega \gamma \mu}}$$

where $\omega$ = radian frequency of the flux
$\gamma$ = conductivity of the material
$\mu$ = permeability of the material From Equation 2 it is seen that the depth of penetration can be made as large as one pleases by making the frequency small enough. To obtain a quantitative orientation, it is well to calculate the value of the depth of penetration for certain conditions. Two such calculations are given by:

(3) $\delta$ = 8.5 millimeters for copper at 60 cycles
$\delta$ = 0.5 millimeter for iron at 60 cycles.

Suppose it were desired to measure a pipe with an iron wall of say 4 millimeters' thickness. To make the scheme of Figure 1 workable, it would be desirable that the round trip through the wall and back should be of the order of one depth of penetration. This means that the depth of penetration would have to be 8 millimeters, or 16 times the quantity of ½ millimeter given above for iron.

To accomplish this, the frequency would have to be reduced below 60 cycles by the factor 16×16=256. The resulting frequency is only a fraction of the cycle per second. In most applications it is therefore not feasible to increase the depth of penetration into iron by reducing the frequency, since the required frequency is too low for practicability.

Before the present invention was developed in its final form, an intermediary version was tested theoretically and experimentally. To explain the principle of operation of the present invention, it is useful to describe this intermediary system.

Figure 2:
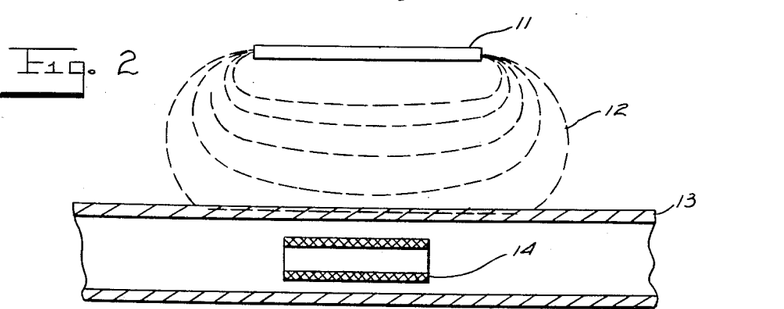
Figure 2 is a schematic drawing of one form of measuring the wall thickness of an iron pipe.

In this transitional form, a magnetic field was created by primary coils located a considerable distance away from the outside of the pipe to be tested. This arrangement is seen in Figure 2 in which an alternating current solenoidal magnet 11 is placed at a considerable distance from a pipe 13 which is to be measured. In Figure 2 it is seen how the flux lines 12 from the magnet 11 reach out and run approximately parallel to the pipe at the point at which the test is to be made. Some of this flux penetrates to the interior of the pipe and therein generates an electromotive force in the pickup coil 14 located inside the pipe.

From the point of view of field theory, it is instructive to sketch the lines representing the flow of energy in addition to those representing the magnetic field. It is known from the theory of the electromagnetic field that the flow of energy can be represented by a vector which is everywhere perpendicular to both the electric and magnetic fields. In electromagnetic theory, this vector is known as the Poynting vector. In an electromagnetic field one can sketch in lines which are at every place parallel to this Poynting vector. These lines however differ from the lines of magnetic flux, in that they are not necessarily continuous; that is, in contradistinction to the lines of magnetic flux, they can have a beginning and an end. The ending of a line implies that power is being delivered to or taken from that point. These Poynting vector lines will show the energy flow into and out of the magnetic field and also the flow of energy into a metal where it is dissipated.

Figure 3:
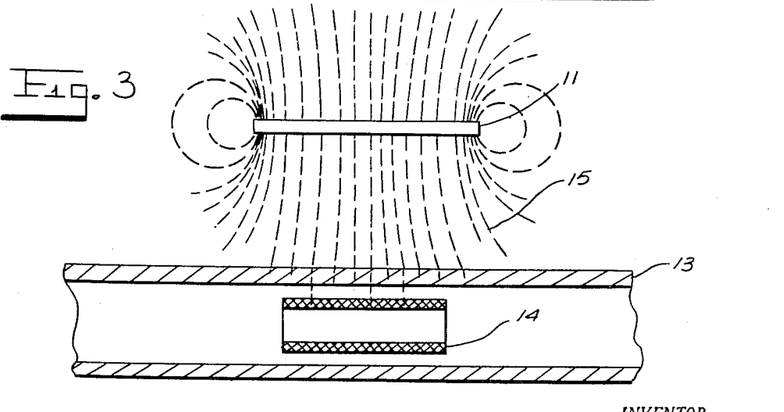
Figure 3 is a schematic drawing of the same device in which are sketched the lines of energy flow.

Figure 3 is a reproduction of the configuration of Figure 2 wherein the lines of energy flow 15 have been drawn instead of the lines of magnetic flux 12. It is seen that some of these lines of energy flow proceed from the alternating current solenoidal driving magnet 11 into the pipe. Once inside the pipe, most of these lines terminate, feeding energy into the metal which is dissipated in heat. A very small number manage to penetrate to the inside and deliver energy to the pickup coil 14, part of which eventually activates the indicating instrument. The intensity of the Poynting vector of energy flow in a homogeneous material is proportional to the square of the magnetic field strength. The variation of the strength of this Poynting vector N, is given by the equation:

(4)
$$N = N_0 \epsilon^{-2\frac{x}{\delta}}$$

where the symbols have the same meaning as before with the addition that:

$N$ = the magnitude of energy flow at a depth $x$
$N_0$ = the magnitude of the energy flow at the surface of the metal From Equation 4 it is seen that only a very small part of the energy entering the pipe 13 in Figure 3 will ever penetrate to the pickup coil 14. This, however, is no particular disadvantage since amplification is very easy.

The magnitude of the voltage induced in coil 14 will vary with the thickness in the same way that the flux varies; that is, it will be exponentially related to the wall thickness by an equation similar to Equation 1. This means that if the induced voltage is measured with a logarithmic voltmeter, the readings of pointer deflection of such a voltmeter will be linearly related to the thickness of the wall. This would make it very simple to calibrate the voltmeter scale to read directly in thickness.

Alternatively, but less convenient, a phase measurement yielding the same result could be made. Since the phase angle between the induced electromotive force in the pickup coil 14 of Figure 3 and the current flowing in the A. C. coil 11 is linearly related to the wall thickness, a phase meter measuring this angle could be directly calibrated in terms of thickness.

This phase relationship is not shown in the equations given above, but it is known that the phase rotates one radian when the wave progresses one depth of penetration through a metal.

This means that if the wall were increased from one depth of penetration to two depths of penetration, the phase would rotate one radian while the intensity dropped by a factor of 2.718. Hence, either polar coordinate, phase or amplitude, can be used to determine the wall thickness in this now obsolete method. It is however generally much more convenient to measure amplitude than phase.

The present invention results from the discovery that it is possible to carry out the general principles of measurement described above and depicted in Figure 3 and still have both coils inside the pipe. The reason for this will be clear from an examination of the lines of power flow from a primary to a secondary coil, when both are located in the pipe and sufficiently separated.

Figure 4:
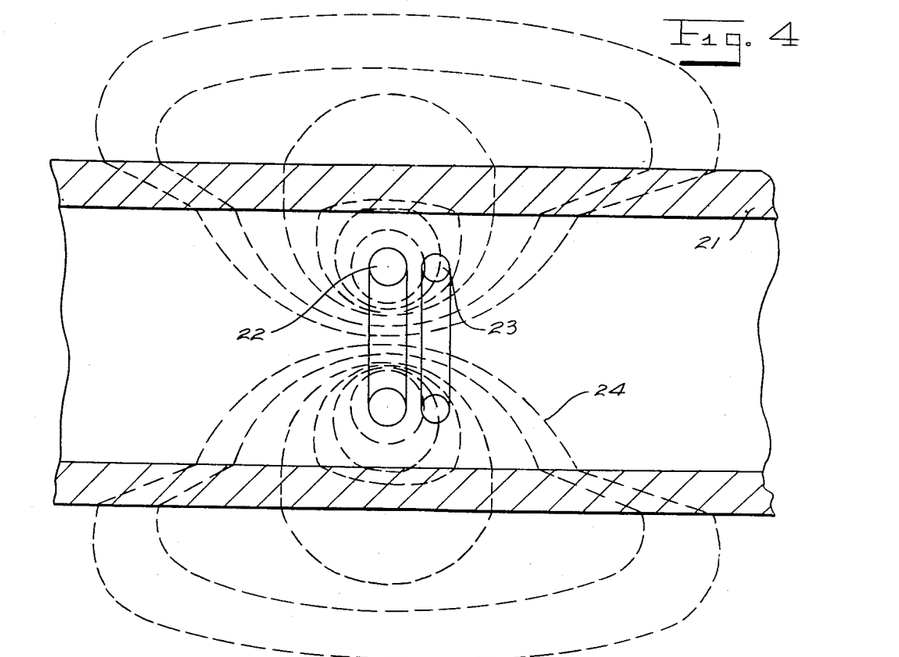
Figure 4 is a drawing of a primary and secondary coil in close proximity within a pipe as used in the prior art.

In Figure 4, 21 is a pipe within which is a primary coil 22 carrying an alternating current and adjacent to which is a secondary coil 23 in which a voltage is induced as in the prior art. Primary coil 22 generates a magnetic field whose approximate configuration is indicated by the lines 24 in Figure 4. It is obvious that the magnetic field 24 will induce a voltage in the secondary coil 23, although it is by no means clear how and to what extent this voltage will be dependent upon the thickness of the iron. However it is known from the previous discussion and can be supported from an examination of the general configuration of the flux lines in Figure 4 that the induced voltage will be relatively unaffected by increments to the thickness of the pipe 21 providing the pipe is already thick enough.

Figure 5:
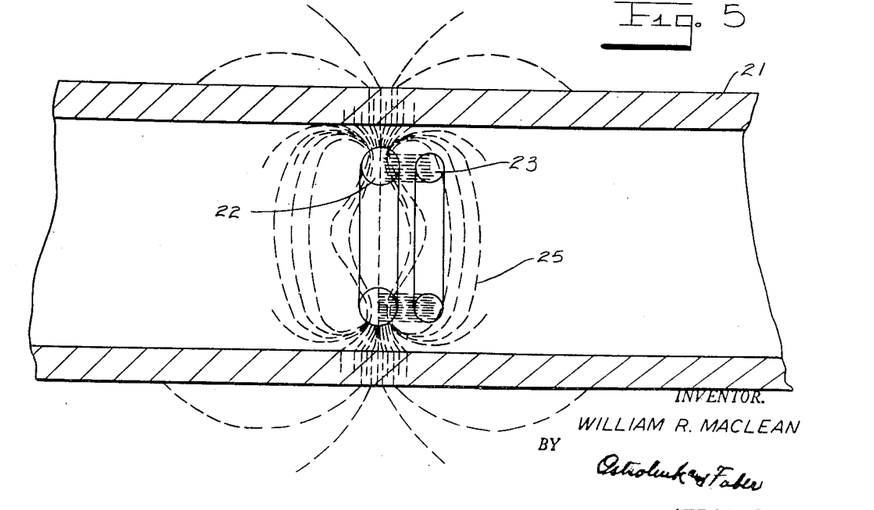
Figure 5 is a similar drawing in which are sketched the lines of energy flow.

Figure 5 shows the same configuration of pipe and coils. Instead of flux lines however, the lines of power flow which are everywhere parallel to the above mentioned Poynting vector are shown as the dotted lines 25. It should be borne in mind that these lines are not continuous as are flux lines and should really be shown in great density near the primary coil 22, thinning out appreciably with increasing distance therefrom and even more appreciably in traversing the pipe walls 21. These lines are everywhere at right angles to the magnetic lines of Figure 4 and also at right angles to the lines of electric field, which latter are circles concentric with the axis of the pipe and hence normal to plane of the drawing of Figure 5.

Hence these lines of power flow lie in the plane of the drawing of Figure 5 and normal to the flux lines of Figure 4. It can be seen that a strong concentration of these lines of flow extends from the primary coil and ends in the secondary coil. Over these lines flows the power consumed by the secondary coil. A certain number of these power flow lines also penetrate the pipe wall 21 and terminated therein, supplying power to maintain the eddy currents in the pipe. A far smaller number of these lines penetrate to the outside of the pipe to establish there a magnetic field.

Figure 6:
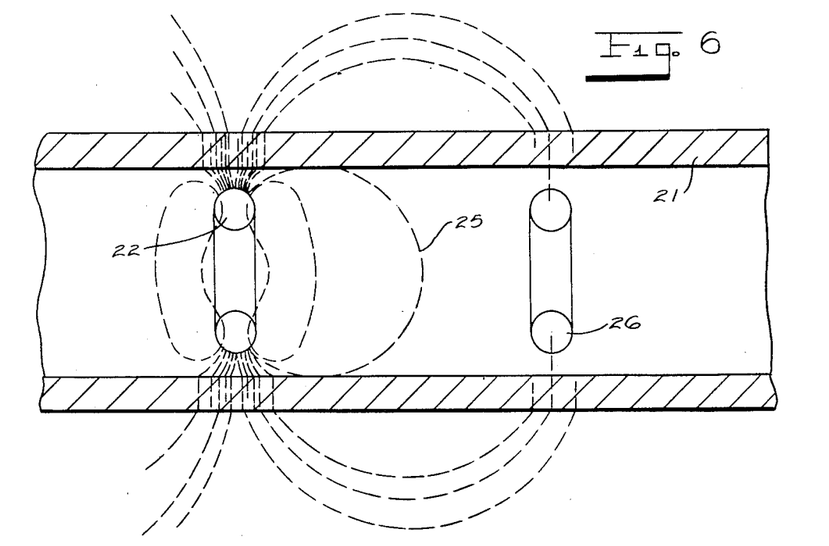
Figure 6 is a drawing of a primary and secondary coil inside a pipe with large separation as used in one form of the present invention.

Figure 6 which represents the present invention is a sketch of the same arrangement in which, however, the spacing between the primary coil 22 and the secondary coil 26 has been greatly increased. In Figure 6 also are sketched the lines of power flow 25.

The important observation which leads to the present invention and which can be deduced in a quasi-quantitative manner from a consideration of the field pattern associated with the coil configuration of Figure 6, is that most of the power flow lines leading from the primary to the secondary coil go out of the pipe and re-enter again. This means that the energy supplied to the secondary coil in the case of a large separation between the two coils has essentially flowed to the outside of the pipe and back in again. Hence this energy stream has suffered an attenuation by a double passage through the walls of the pipe.

In principle the exact energy flow pattern for the structure of Figure 5 and the invention of Figure 6 could be calculated but the complexity of the geometry leads to practically insuperable mathematical difficulties. However, from the qualitative intuitive sketching of energy flow lines for the actual proportions of Figure 5 and Figure 6, one feels that the energy flowing to the secondary coil 23 in Figure 5 comes directly from the primary coil and that there is no contribution from energy flow lines which have penetrated the pipe 21. On the other hand, for the proportions of Figure 6 one feels that the energy flow lines which have gone out of the pipe 21 and re-entered again contribute the dominant amount of energy to the secondary coil 26 whereas only a negligible amount of energy arrives over flow lines proceeding directly from the primary 22 to the secondary 26. This intuitive feeling can and has been subjected to experimental verification as will be discussed later.

By this means therefore, a result has been accomplished quite similar to that of the original arrangement of Figure 3, except that in this case a double passage through the pipe walls is effected. The result, however, differs radically from that of the structure shown in Figure 5.

In the present invention the induced voltage in the secondary coil 26 of Figure 6 is exponentially related to the sum of the wall thickness near the secondary coil and the wall thickness near the primary coil. Except for a scale factor, this means that the induced electromotive force in the secondary coil 26 is exponentially related to the average wall thickness in the two places by an equation similar to Equation 1. This means also that if this induced voltage is measured with a logarithmic voltmeter, the pointer deflection will be linearly related to the average wall thickness and can therefore be readily calibrated in these terms.

Although the difference between the present invention as depicted in Figure 6 and the structure in Figure 5 is merely one of spacing between the coils, this difference results in a totally different relationship between induced voltage and wall thickness, the difference being just such as to make the present invention practical for pipes of ferrous metals whereas the prior art was not.

A purely theoretical determination of the spacing needed between the primary coil 22 and the secondary coil 26 of Figure 6 to accomplish the purposes of the present invention is almost impossible. However, by a combination of theory and experiment, it can be determined. For this purpose use is made of the theory of simpler structures which can be calculated. The theoretical results of some simpler but relevant structures are:

A. If the pipe 21 were absent in Figure 6, the energy received by the secondary would fall off as an inverse power of the spacing.

B. If the pipe 21 in Figure 6 were infinitely thick, the energy received by the secondary would fall off as a negative exponential function of the spacing at large spacings.

C. In a qualitative way it can be shown that the field outside of the pipe 21 of Figure 6 falls off as an inverse power of the spacing.

D. Any quantity falling off as a negative exponential eventually becomes weaker than any other quantity falling off as an inverse power.

In Figure 6 imagine the secondary 26 gradually withdrawn from the proximity of the primary 22. When the spacing is very small, the pipe 21 plays a negligible role and the received energy falls off as if the pipe 21 were absent. As the spacing increases, the presence of the pipe has a dominating effect, and the energy received by the secondary falls off as a negative exponential. The secondary 26 at this time is actually receiving energy in two ways: first, directly from the primary 22 which energy is weakened by the attenuation due to distance, and second, indirectly by energy which has made a double transit of the pipe. This latter energy is weakened by this double transit and also by the inverse power law. As the spacing increases still more, the direct energy under the influence of the exponential law will eventually fall below the indirect energy obeying the weaker inverse power law and the latter energy will dominate. At this point the spacing is sufficient.

In a model of the present invention, I have carried out such an experiment. I plotted the energy received by the secondary as a function of the spacing. By plotting the energy in logarithmic units, i. e., in decibels, against the spacing in centimeters, the exponential law appears as a straight line.

Figure 9:
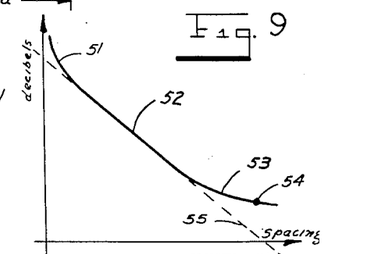
Figure 9 is a plot in which the energy received by the secondary is shown as a function of the spacing.

Figure 9 is such a plot. 51, 52, 53, 54 are various parts of the plotted curve. 55 is an extrapolation of the straight part. At small spacings, the received energy follows the curved part 51. At larger spacings it follows the straight part 52. When the exponential law has overtaken the inverse power law, the energy falls off less rapidly as in the part 53. In this region the indirect energy is dominant. At the point 54 the direct energy is considered sufficiently weak compared to the indirect and the spacing corresponding to the point 54 is the proper spacing.

The determination of Figure 9 is carried out on a sample of pipe having the maximum wall thickness of any to be measured. If a thinner pipe is then substituted, the indirect energy will increase but the direct energy will remain constant, i. e., the indirect energy will dominate even more. Since the indirect energy is exponentially related to the wall thickness for a fixed spacing, the purposes of the invention have been accomplished.

The correct spacing can be determined in another way by the use of several samples of pipe of various thicknesses. For example, by three samples of thicknesses ⅓, ⅔ and ⅗ of full thickness. One then measures the drop in energy in decibels $\Delta_1$, when the ⅔ pipe is substituted for the ⅓ pipe, and also the drop $\Delta_2$, when the ⅗ pipe is substituted for the ⅔. At small spacings $\Delta_1$ and $\Delta_2$ will both be nearly zero. At medium spacings $\Delta_1$ will be larger than $\Delta_2$. At the correct spacing they will be essentially equal. At still larger spacings, they will still be essentially equal, but the received energy will be unnecessarily weak.

Figure 7:
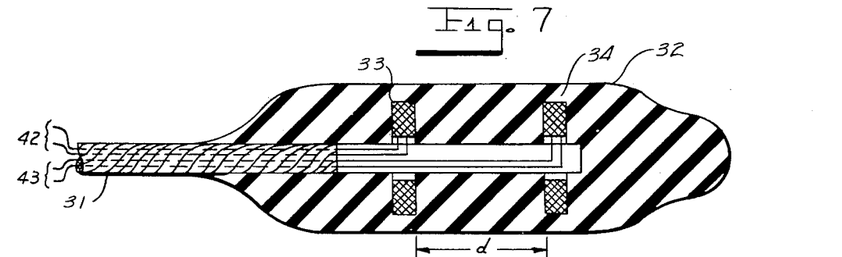
Figure 7 is a cross-sectional view of the probe mechanism employed in carrying out my invention.

Figure 7 shows one practical embodiment of the present invention wherein a primary coil 33 and a secondary coil 34 are mounted in a housing 32 which serves as a probe on the end of a flexible cable 31. The flexible cable 31 carries a pair of wires 42 to supply the primary coils 33 with alternating current and a second pair of wires 43 connected to the secondary coil 34. By means of this latter pair, the secondary coil is connected to a logarithmic voltmeter located near the operator.

It is found that ordinary 60 cycle current is satisfactory for exciting the primary coil 33 which is a great convenience. The distance, $d$, between the two coils as shown in Figure 7 should be judicially chosen as discussed above. If this distance is too close, the purposes of this invention are not accomplished; that is, the induced voltage will be insensitive to thickness variations beyond a certain maxmum thickness which may be too small for the practical application at hand.

If, however, the distance, $d$, is far greater than necessary, the induced voltage will be weakened and will require extra amplification. In making such a probe as used in this invention for application to pipes of a certain size and nominal wall thickness, it is desirable to adjust the distance, $d$, to not much more than that value at which the induced voltage first bears an exponential relationship to increments of wall thickness over and under the nominal thickness of pipe on which it is desired to apply the invention. Therefore, if the measurements involve pipes of various sizes and wall thicknesses, it will be desirable to have a selection of probes so that one may be used which fulfills these conditions. In such a selection of probes all similar in arrangement to that of Figure 7, a great leeway of proportions and dimensions may be allowed for arbitrary or obvious reasons: the coils may be short and thick, long and thin, have individual iron cores or not, have many or few turns. The only essential dimension strictly relevant to the present invention is the spacing $d$ which is to be determined as described above, for the chosen frequency at which the device is to operate.

A model for use with 1⅛" standard steel pipe which I built and tested and found satisfactory had the following dimensions:

Primary coil:
    Outside diameter=⅞ inch
    Length=1 3/32 inches
Secondary coil:
    Outside diameter=⅞ inch
    Length=1⅛ inches
Spacing between adjacent coil faces=2¾ inches The number of turns on the coils is not relevant to the operation in principle. For convenience, the primary was wound to operate from the 6 volt 60 cycle heater transformer already present in the logarithmic amplifier, and the secondary was wound to feed directly into a grid without an input transformer. Each coil was wound on a laminated iron core of 0.45 inch outside diameter and ¼ inch inside diameter formed by winding thin sheet steel around a central ¼ inch brass rod running through both coils. The winding data was:

Primary: 3,000 turns #35

Secondary: 30,000 turns #44

Figure 8:
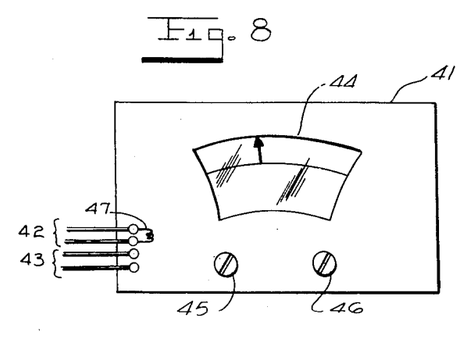
Figure 8 is a schematic of the meter indicator employed in my invention.

Figure 8 is a view of the panel of a measuring instrument to be associated with the probe of Figure 7. This measuring instrument will in most cases be operated from an alternating current power line which will make readily available 60 cycle power for the excitation of the primary coil. From a transformer secondary 41 this coil is then fed over pair 42 which form one pair of the multi-conductor cable 31 of Figure 7. Another pair of wires 43 of the multi-conductor cable which comes from the secondary coil 34 of Figure 7 is fed into the logarithmic voltmeter contained in the instrument of Figure 8.

The logarithmic voltmeter, as is well known in the art, can be constructed in various ways. In one of these ways an ordinary linear direct current voltmeter 44 is used for the moving instrument and with which is associated an electronic circuit of such a nature that the linear excursions of the pointer are logarithmically related to the amplitude of the applied voltage. In such an electronic logarithmic voltmeter, it is also convenient to have available two sensitivity adjustments. One of these adjustments, often in the form of a shunt on the direct current meter, could be called the logarithmic sensitivity control. It would adjust the sensitivity in terms of decibel change for full scale deflection.

As is well known, a logarithmic voltmeter must necessarily always be of the depressed zero type. This means that the pointer will show no movement until the impressed signal exceeds a certain threshold value. The magnitude of this threshold can be made variable by a linear gain control in the associated electronic equipment.

In the instrument of Figure 8, we can then imagine the screw driver control 45 as being the linear gain control and a similar adjustment 46 as being the logarithmic control. More explicitly, this means that the linear control 45 controls the voltage necessary to make the pointer move at all, and the logarithmic control 46 changes the number of decibels range.

For continued and repeated use on pipes of the same nominal kind, it may be convenient to mark the scale of the moving instrument 44 from 0 to 100 and hence have it read in percent of nominal thickness. The linear and logarithmic gain controls 45 and 46 will make it possible to calibrate the instrument in this way.

Figure 10:
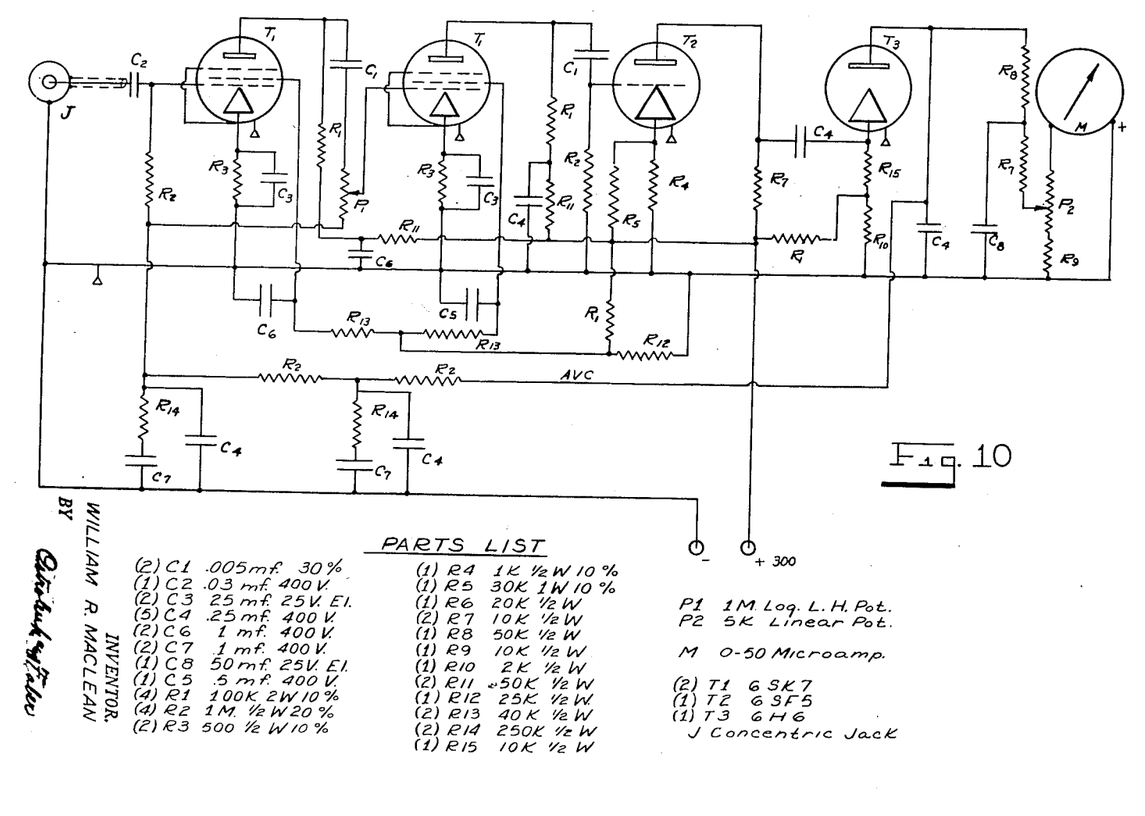
Figure 10 is a circuit diagram used in carrying out my invention.

A logarithmic amplifier embodying the features discussed above was constructed for use with the probe already described. A schematic diagram with complete quantitative data is shown in Figure 10. In this figure J is a concentric input jack to which connects pair 43 of Figure 7 coming from the secondary coil 34. This pair 43 is in the form of a shielded concentric wire to reduce spurious pick-up. Pair 42 of Figure 7 leading to the primary coil 33 connects to the 6 volt heater transformer not shown in Figure 10. The hot terminal of concentric jack J of Figure 10 feeds to a conventional two-stage amplifier comprising the two tubes $T_1$.

This amplifier has, however, automatic volume control supplied over bus marked AVC. It has also a linear gain control $P_1$. This two-stage amplifier is followed by a threshold tube $T_2$ biased beyond cut-off by the network $R_4$ and $R_5$. No plate current flows in tube $T_2$ until the input at J exceeds a threshold value determined by the setting of the linear gain control $P_1$. Threshold tube $T_2$ feeds a diode rectifier $T_3$ which supplies the AVC voltage to the AVC bus. This AVC voltage is supplied to the two-stage amplifier $T_1$ and $T_1$ through an anti-motor boating filter circuit. This AVC voltage is measured by meter M whose sensitivity is adjustable by the potentiometer $P_2$.

It can be shown that in a properly proportioned circuit, this AVC voltage is proportional to the logarithm of the input voltage. The proportionality constant is determined by the potentiometer $P_2$. The constants of the circuit of Figure 10 have been carefully proportioned to give proper logarithmic readings over a range of about 40 decibels.

The potentiometer $P_1$ is the linear gain control 45 of Figure 8 and potentiometer $P_2$ is the logarithmic gain control 46 of Figure 8.

Figure 11:
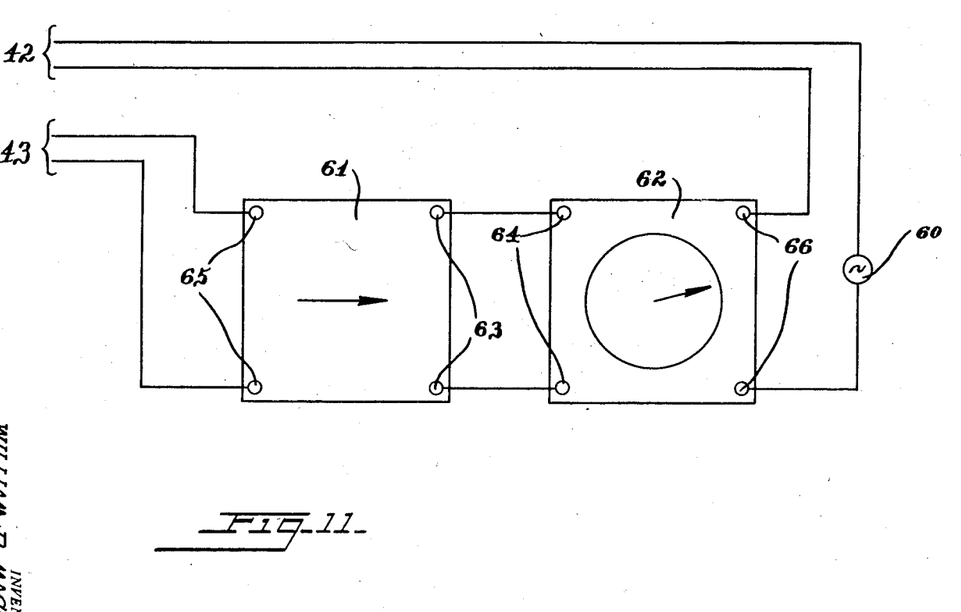
Figure 11 is a block schematic for carrying out one version of my invention.

The purposes of this invention can in principle be obtained equally well by measuring the other polar coordinate of the induced electromotive force in the secondary coil 34 of Figure 7, that is the phase angle between this induced electromotive force and the driving current in the primary coil 33. As was mentioned before, this angle is linearly related to the average wall thickness near the primary and near the secondary coil. However, measurement of amplitude is generally more convenient than measurement of phase. To measure this phase angle the obvious arrangement of Figure 11 may be employed wherein a source of alternating current 60 supplies the primary coil 33 of Figure 7 over cable pair 42, passing through in route one pair of terminals 66 of conventional phase angle meter 62. The induced voltage in secondary coil 34 of Figure 7 then feeds over cable pair 43 to input terminals 65 of conventional amplifier 61 whose output terminals 63 connect to the second pair of terminals 64 of phase meter 62. The phase angle between the induced secondary voltage and the primary current is then readable on phase angle meter 62.

It is therefore seen that in a device for measuring the wall thickness of a pipe from the inside consisting of a primary and secondary coil located inside the pipe, a fundamental change in the significant characteristics of the field configuration is made by decreasing the coupling between the primary and secondary. In the closely coupled case, the energy flows directly from the primary to the secondary coil, whereas in the loosely coupled case, the energy flows to the secondary coil by means of a round trip through the walls of the pipe.

It is the utilization of this latter phenomenon which is the essence of the present invention. It differs physically from the prior art primarily by the increased spacing. An important but not absolutely essential feature of the present invention is the association with the probe of a logarithmic voltmeter, or alternatively of a phase angle meter, to obtain a convenient scale of thickness.

The present invention has been described using as an example the case of primary and secondary coils oriented co-axially with the pipe. This however is not essential. It is also possible to orient them differently: for instance with their axes normal to the axis of the pipe. The choice of orientation is one of convenience in those cases where the thickness of the pipe can be presumed to be approximately axially symmetrical.

By the use of a probe with transverse coils, it would be possible to rotate the probe and search for asymmetries in the pipe. There are circumstances under which this would be useful.

As a matter of convenience it may be useful to mark the outside of the flexible cable 31 of Figure 7 in linear measure, such as feet, so that the location of a thin spot can be readily observed.

It is also possible to associate the present invention with a recording instrument so that a permanent record of wall thickness as a function of axial location is obtained. In this case it would be convenient to interlock the movement of the probe with the movement of the recording paper. Numerous ways of accomplishing this will suggest themselves to those skilled in the art.

The present invention has been described principally in terms of its operation in pipes of ferrous metal. It is however still operative in non-ferrous metals where it has the advantage over the prior art in giving indications which are readily calibrated to read directly in terms of wall thickness. In the case of non-ferrous pipes, however, it may at times be advantageous to use a frequency higher than 60 cycles to decrease the depth of penetration so that a larger fluctuation of induced voltage with change in pipe wall thickness is obtained.

The present invention has been described for the specific example of the measurement of the wall of a round pipe. Nothing would be changed in principle if the pipe were square or rectangular in cross-section. The drawings are also for the example of a rather small pipe essentially filled by the coils of the probe. The same sized coils could be used in a large pipe as well. Such a large pipe would require a different coil spacing, however, which would be determined by the procedures outlined above. In other words, the invention will measure the thickness of metal under various circumstances.

Since many variations and applications of the ideas embodied in my invention will be apparent to those skilled in the art, I prefer to have my invention described by the following claims.

I claim:

1. In an apparatus for measuring the thickness of the wall of a pipe from the inside, a primary coil located within said pipe, means for supplying said primary coil with alternating current, a secondary coil located within said pipe, and means for measuring a polar coordinate of the voltage in said secondary coil induced by the current in said primary coil; the spacing between said coils being sufficient to cause said voltage to vary essentially exponentially with the thickness of said wall.

2. In an apparatus for measuring the thickness of the wall of a pipe from the inside, a primary coil located within said pipe, means for supplying said primary coil with alternating current, a secondary coil located within said pipe, said coils being mounted together to form a probe, a multi-conductor cable attached mechanically to said probe, one pair of wires of said cable being connected to said secondary coil, and means including said pair of wires for measuring a polar coordinate of the voltage in said secondary coil induced by the current in said primary coil; the spacing between said coils being sufficient to cause said voltage to vary essentially exponentially with the thickness of said wall.

3. In an apparatus for measuring the thickness of the wall of a pipe from the inside, a primary coil located within said pipe, means for supplying said primary coil with alternating current, a secondary coil located within said pipe, said coils being co-axial with said pipe, and being mounted together to form a probe, a multi-conductor cable attached mechanically to said probe, one pair of wires of said cable being connected to said secondary coil, an amplifier-voltmeter combination for measuring the voltage induced in said secondary coil by the current flowing in said primary coil, said amplifier-voltmeter being of the logarithmic type and having both linear and logarithmic gain control, means including said pair of wires for connecting said amplifier-voltmeter to said secondary coil; the spacing between said coils being sufficient to cause said voltage to vary essentially exponentially with the thickness of said wall.

4. In an apparatus for measuring the thickness of the wall of a pipe from the inside, a primary coil located within said pipe, means for supplying said primary coil with alternating current, a secondary coil located within said pipe, and means for measuring the voltage in said secondary coil induced by the current in said primary coil; the spacing between said coils being sufficient so that the energy received by said secondary coil via a path lying wholly inside said pipe is relatively much less than the energy received by said secondary coil via a path passing through the wall of said pipe.

5. In an apparatus for measuring the thickness of the wall of a pipe from the inside, a primary coil located within said pipe, means for supplying said primary coil with alternating current, a secondary coil located within said pipe, and means for measuring the voltage in said secondary coil induced by the current in said primary coil; the spacing between said coils being sufficient so that an additional increment of spacing creates an increment of attenuation of energy received by said secondary coil from said primary coil much smaller than the analogous increment of attenuation calculated for a pipe of infinite wall thickness.

6. In an apparatus for measuring the thickness of the wall of a pipe from the inside, a primary coil located within said pipe, means for supplying said primary coil with alternating current, a secondary coil located within said pipe, and means for measuring the voltage in said secondary coil induced by the current in said primary coil; the spacing between said coils being experimentally determined as follows: a plot of the logarithm of the voltage induced in said secondary coil from said primary coil versus the said spacing is made and a spacing chosen at which said logarithm is considerably more than an extrapolation of the straight part of said plot would yield.

7. In an apparatus for measuring the thickness of the wall of a pipe from the inside, a primary coil located within said pipe, means for supplying said primary coil with alternating current, a secondary coil located within said pipe, and means for measuring the voltage in said secondary coil induced by the current in said primary coil; the spacing between said coils being larger than the diameter of said pipe.

WILLIAM B. MacLEAN.

REFERENCES CITED

The following references are of record in the file of this patent:

UNITED STATES PATENTS

| Number | Name | Date |
| --- | --- | --- |
| 2,111,210 | Ebel | Mar. 15, 1938 |
| 2,124,579 | Knerr et al. | July 26, 1938 |
| 2,150,922 | Hay | Mar. 21, 1939 |
| 2,353,211 | Zuschlag | July 11, 1944 |
| 2,455,792 | Meunier | Dec. 7, 1948 |